(12) United States Patent
Stoner

(10) Patent No.: US 6,338,465 B1
(45) Date of Patent: Jan. 15, 2002

(54) FISHING ROD HOLDER

(76) Inventor: Freddie Stoner, 6577 George Washington Hwy., Oakland, MD (US) 21550

( * ) Notice: Subject to any disclaimer, the term of this patent is extended or adjusted under 35 U.S.C. 154(b) by 0 days.

(21) Appl. No.: 09/444,146

(22) Filed: Nov. 20, 1999

(51) Int. Cl.$^7$ .................. A01K 97/10; A45B 25/28; A45F 3/44; A47G 25/12; A47G 33/12
(52) U.S. Cl. .................. 248/530; 43/21.2; 248/156
(58) Field of Search .................. 248/530, 534, 248/535, 156, 513, 520, 518; 43/21.2, 27.4

(56) References Cited

U.S. PATENT DOCUMENTS

| | | | | |
|---|---|---|---|---|
| 2,202,739 A | * | 5/1940 | Kilby | 248/38 |
| 2,491,008 A | | 12/1949 | Lake | 248/42 |
| 2,515,426 A | | 7/1950 | Rodgers | 248/42 |
| 2,519,612 A | * | 8/1950 | Tuttle | 248/38 |
| 2,530,265 A | | 11/1950 | Phalen | 248/42 |
| 2,704,412 A | | 3/1955 | Davis | 43/21.2 |
| 2,852,218 A | * | 9/1958 | Stires | 248/39 |
| D187,276 S | | 2/1960 | Poglein | D31/4 |
| 2,954,909 A | | 10/1960 | Miller et al. | 224/5 |
| D202,432 S | | 9/1965 | Turiace, Jr. | D31/4 |
| 3,341,157 A | | 9/1967 | Duncan | 248/42 |
| 3,385,544 A | | 5/1968 | Barnett | 248/39 |
| D221,278 S | | 7/1971 | Wright | D22/22 |
| D221,279 S | | 7/1971 | Erickson | D22/8 |
| 3,612,455 A | * | 10/1971 | Cole | 248/44 |
| 3,669,390 A | | 6/1972 | Nielson | 248/42 |
| 4,372,072 A | | 2/1983 | Comeau | 43/21.2 |
| 4,611,427 A | | 9/1986 | Coutcher | 43/21.2 |
| 4,650,146 A | * | 3/1987 | Duke | 248/512 |
| 4,656,774 A | | 4/1987 | Terrill | 43/21.2 |
| 4,871,099 A | | 10/1989 | Bogar, Jr. | 224/42.45 R |
| 4,938,446 A | * | 7/1990 | Williams | 248/530 |
| D332,821 S | | 1/1993 | Padilla | D22/147 |
| 5,383,644 A | * | 1/1995 | Huse | 248/523 |
| D359,793 S | | 6/1995 | Medlin, Jr. et al. | D22/147 |
| 5,435,473 A | | 7/1995 | Larukum | 224/569 |
| 5,557,877 A | | 9/1996 | Colson | 43/21.2 |

FOREIGN PATENT DOCUMENTS

| | | | |
|---|---|---|---|
| GB | 2247142 A | 2/1992 | A01K/97/10 |
| JP | 6-105638 | 4/1994 | A01K/97/10 |

* cited by examiner

*Primary Examiner*—Ramon O. Ramirez
*Assistant Examiner*—Alfred Joseph Wujciak
(74) *Attorney, Agent, or Firm*—Harvey Lunenfeld

(57) ABSTRACT

A fishing rod holder comprising: a frame adapted to support and pivotally hold a at least one fishing rod, the frame having an anteriorly disposed side and a posteriorly disposed side, each opposing the other, and opposing sides, the anteriorly disposed side having a plurality of anterior fishing rod accommodations, and the posteriorly disposed side having plurality of corresponding inverted posterior fishing rod accommodations; a support member for supporting the frame; at least one supplementary strut therebetween the frame and the support member; and mounting means adapted to mount the fishing rod holder thereonto a surface. The fishing rod holder is simple, effective, lightweight, durable, capable of allowing quick and easy access, installation, and removal of at least one and a plurality of fishing rods thereon and therefrom, respectively, and requiring no assembly or minimal assembly, inexpensive, attractive, quick and easy to install and remove therefrom a surface, being removably attachable therefrom, compactly storable, and may be configurated and of unitary construction. The fishing rod holder is capable of removably holding at least one fishing rod thereon having the fishing rod angularly disposed at an attitude, and is adapted to removably hold a plurality of fishing rods angularly offset one from the other, to minimize the chances of lines from each of the fishing rods entangling one another. The fishing rod holder is capable of being removably engaged thereinto the ground, or removably mounted thereonto other surfaces, such as of a dock, railing, or boat.

24 Claims, 5 Drawing Sheets

FISHING ROD HOLDER

BACKGROUND OF THE INVENTION

1. Field of the Invention

The present invention relates generally to devices for fishing and more particularly to fishing rod holders.

2. Background Art

Fishing dates back at least 10,000 years, as man has sought fish for sustenance and sport from at least that time. Often using a fishing rod, or in many instances attempting to maximize his harvest of fish, for food, or sport, or just to lie back and relax, until a fish or fish bite, man has attempted to devise means for holding his fishing rod or rods, while waiting for the excitement to begin.

There is a need for a simple, effective, lightweight, durable, fishing rod holder for quick and easy access, installation, and removal of at least one and a plurality of fishing rods thereon and therefrom, respectively, and requiring no assembly or minimal assembly. The fishing rod holder should be inexpensive, attractive, quick and easy to install and remove therefrom a surface, being removably attachable therefrom, and compactly storable, the fishing rod holder and/or portions of the fishing rod holder preferably being configurated and of unitary construction. The fishing rod holder should be adapted to removably hold at least one fishing rod thereon having the fishing rod angularly disposed at an attitude, and adapted to removably hold a plurality of fishing rods angularly offset one from the other, to minimize the chances of lines from each of the fishing rods entangling one another. The fishing rod holder should allow for pivotally removably mounting the fishing rods thereon, with reels of the fishing rods forward of the fishing rod holder, to allow for quick access, installation, and removal of the fishing rods to and from the fishing rod holder. The fishing rod holder should be capable of being removably engaged thereinto the ground, having improved anchoring means for engaging the fishing rod holder thereinto the ground by foot pressure, without the foot sliding off the anchor, or removably mounted thereonto other surfaces, such as of a dock, railing, or boat.

Different fish rod holder and supports have heretofore been known. However, none of the fishing rod holder or supports adequately satisfies these aforementioned needs.

Fishing rod holders for holding a plurality of fishing rods have been disclosed.

U.S. Pat. No. 3,385,544 (Barnett) discloses a dual rod and reel holder having a support member adapted for upright installation in the ground or on a boat, and further incorporating angularly adjustable arm means for mounting fishing rods and defining a selected attitude of use.

U.S. Pat. No. 4,611,427 (Coutcher) discloses a three member fishing rod holder including a ground engaging leg and two pivotally connected arms with fishing rod supporting fingers. The leg and arm is configurated for folding into a compact storage position with leg and arms in a side-by-side relationship.

U.S. Pat. No. 5,557,877 (Colson) discloses a fishing rod holder for holding a plurality of fishing rods. The fishing rod holder has a rigid planar base coupled to a tubular receptacle; a coupling mechanism for securing the base to an external recipient object; a rigid planar bar positioned above the base; an elongated support rod having one end removably coupled with the receptacle of the base and another end pivotally coupled to the bar; and a plurality of spaced and parallel aligned rod holders, with each rod holder formed of an elongated rigid piece of wire, having an anterior section with a generally v-shaped seat for holding a portion of a fishing rod, a posterior section with a loop for receiving an end of a fishing rod, and a central section extended therebetween and coupled to the bar.

Japanese Patent No. JP 6-105638 (Mootoo Senda) discloses a fishing rod holder capable of holding a plurality of fishing rods, comprising a base having two front legs, two rear legs, and links mutually and rotatably connecting each. The base is equipped with a front rod holder between the two front legs, with a rear rod holder between the two rear legs and with a water bag at the rear link.

UK Patent No. GB 2,247,142 A (Keightley) discloses a fishing rod support comprising a support mounted on a "bank stick," the support comprising two or more members, each of the members having a surface having sides, which incline upwardly from a central section of the surface, the surface of one such member located above and offset from another surface of the member, or from another surface of another one of the members.

U.S. Pat. No. 4,871,099 (Bogar, Jr.) discloses a plurality of vertically extending tubular rod holders connected to a plurality of horizontally spaced supports in which the top of each rod holder includes a first downwardly and inwardly tapered slot and a second downwardly extending slot diametrically opposed to the first slot for receiving and holding a fishing reel. One or more enclosures extend vertically between and are supported from two of the horizontally spaced supports and are shaped to receive the blade of a knife.

U.S. Pat. No. 5,435,473 (Larukum) discloses a fishing rod holder having vertical tubes into which handles of fishing rods may be inserted. Each of the vertical tubes has a slot extending from the top of the vertical tube downward for receiving a post of a fishing reel and a hole. A single horizontal restraining bar passes therethrough each of the vertical tubes above the reel posts of the fishing rods mounted therein to prevent removal of the fishing rods. The restraining bar also has a hole, which a padlock may be mounted therethrough, to prevent removal of the restraining bar and thereby the fishing rods.

U.S. Design Pat. Nos. D221,278 (Wright) and D359,793 (Medlin, Jr. et al) each show fishing rod holders for holding a plurality of fishing rods. U.S. Pat. No. D221,278 (Wright) shows a fishing rod pole anchor having three tubes and an anchor having a plurality of tines, each of the tubes for holding a fishing pole; and U.S. Pat. No. D359,793 (Medlin, Jr. et al) shows a fishing rod holder having a pivotable support for two fishing rods hinged to a support shaft.

Fishing rod holders for holding one fishing rod have been disclosed.

U.S. Pat. No. 3,341,157 (Duncan) discloses a fishing pole holder formed of a single length of rod, including a shaft portion, a portion extending laterally away from the shaft portion and a hook portion of a specified shape, terminating in a short upturned end portion that forms an acute angle with the outer end portion of the hook. The handle of a fishing pole may be supported upon the hook portion as a fulcrum, with the upper end of the fishing pole handle being wedged against the upturned end portion of the pole holder, and the lower end of the handle being wedged by the weight of the upper end of the fishing pole, against the bend that connects the shaft portion with the laterally extending portion.

U.S. Pat. No. 3,669,390 (Nielson) discloses fishing pole, comprising a unitary structure formed of stiff configurated wire, including a horizontal arm having at its rear end a hook, which is fitted over the rear end of the fishing pole handle, the forward end of the arm having a cradle upon which a forward portion of the fishing pole handle rests, a forward portion of the arm being adjacent to a downwardly extending leg, the lower end of the leg having means for insertion either into the ground or means for insertion into a bracket mounted upon a boat.

U.S. Pat. No. 4,656,774 (Terrill) discloses a surface engaging fishing pole holder formed of a surface engaging stake, the lower end of which includes an auger adapted to penetrate ice or the ground. A fishing pole support section forms a crank arm, which has an offset handle and a gripping sleeve. The holder may be screwed into ice or the ground surface, by rotating the handle and thereby the auger portion, to secure the same and provide a holder for a fishing pole or the like.

U.S. Pat. No. 4,938,446 (Williams) discloses a fishing rod support having a pair of tines connected by a horizontal member adapted for purchase of the foot to set the tines into the soil. A spaced apart pair of upwardly and downwardly opening rod cradles allows the rod to be positioned within the cradles to clear the reel for unobstructed use.

U.S. Pat. No. 4,372,072 (Comeau) discloses a fishing rod holder, which is capable of being placed in the sand or attached to a bracket, which is accommodated on a bumper of a vehicle. The fishing rod holder comprises a longitudinal tubular member having a reel-accommodating slot, the longitudinal tubular member being secured to a spiked member having an anchor plate. The fishing rod holder can be placed in the sand or ground or within the bracket.

U.S. Pat. No. 2,704,412 (Davis) shows a fishing rod holder having an open tubular receiving support mounted on a support pipe, the support pipe being removably attached to a lower pipe for mounting in the ground or in a receiving clamp, which may be affixed to an object. The open tubular receiving support is disposed at an attitude, such that when the fishing rod is mounted in the open tubular receiving support, the forward end of the fishing rod is higher than the fishing rod handle.

U.S. Pat. No. 2,515,426 (Rodgers) and U.S. Pat. No. 2,530,265 (Phalen) each show fishing rod holders, each of which have a tiltable fishing rod support for mounting a fishing rod therein, the fishing rod support being pivotally affixed to a support member.

U.S. Pat. No. 2,491,008 (Lake) and U.S. Pat. No. 2,954,909 (Miller et al) show fishing rod holders, each having tubular receiving portions for receiving a handle of a fishing rod and support means for the tubular receiving portion, which may be affixed to an object.

U.S. Design Pat. Nos. D187,276 (Poglein), D202,432 (Turiace), D221,279 (Erickson), and D332,821 (Padilla) each show fishing rod holders for holding one fishing rod. U.S. Pat. No. D187,276 (Poglein) shows a configurated tubular fishing rod holder; U.S. Pat. No. D202,432 (Turiace) shows a fishing rod holding sand spike having a spring for inserting a fishing rod therein; U.S. Pat. No. D221,279 (Erickson) shows a foldable fishing pole holder having a fork for holding a fishing pole; U.S. Pat. No. D332,821 (Padilla) shows a fishing pole holder having a spring for holding a fishing pole.

For the foregoing reasons, there is a need for a simple, effective, lightweight, durable, fishing rod holder for quick and easy access, installation, and removal of at least one and a plurality of fishing rods thereon and therefrom, respectively, and requiring no assembly or minimal assembly. The fishing rod holder should be inexpensive, attractive, quick and easy to install and remove therefrom a surface, being removably attachable therefrom, and compactly storable, the fishing rod holder and/or portions of the fishing rod holder preferably being configured and of unitary construction. The fishing rod holder should be adapted to removably hold at least one fishing rod thereon having the fishing rod angularly disposed at an attitude, and adapted to removably hold a plurality of fishing rods angularly offset one from the other, to minimize the chances of lines from each of the fishing rods entangling one another. The fishing rod holder should allow for pivotally removably mounting the fishing rods thereon, with reels of the fishing rods forward of the fishing rod holder, to allow for quick access, installation, and removal of the fishing rods to and from the fishing rod holder. The fishing rod holder should be capable of being removably engaged thereinto the ground, having improved anchoring means for engaging the fishing rod holder thereinto the ground by foot pressure, without the foot sliding off the anchor, or removably mounted thereonto other surfaces, such as of a dock, railing, or boat.

SUMMARY

The present invention is directed to a simple, effective, lightweight, durable, fishing rod holder capable of allowing quick and easy access, installation, and removal of at least one and a plurality of fishing rods thereon and therefrom, respectively, and requiring no assembly or minimal assembly. The fishing rod holder is inexpensive, attractive, quick and easy to install and remove therefrom a surface, being removably attachable therefrom, and compactly storable. The fishing rod holder and/or portions of the fishing rod holder may be configured and of unitary construction. The fishing rod holder is capable of removably holding at least one fishing rod thereon having the fishing rod angularly disposed at an attitude, and is adapted to removably hold a plurality of fishing rods angularly offset one from the other, to minimize the chances of lines from each of the fishing rods entangling one another. The fishing rod holder is adapted to allow for the fishing rods to be pivotally removably mounted thereon, with reels of the fishing rods forward of the fishing rod holder, to allow for quick access, installation, and removal of the fishing rods to and from the fishing rod holder. The fishing rod holder is capable of being removably engaged thereinto the ground, having improved anchoring means for engaging the fishing rod holder thereinto the ground by foot pressure, without the foot sliding off the anchor, or removably mounted thereonto other surfaces, such as of a dock, railing, or boat. The fishing rod holder may be of metal, such as aluminum, brass, copper, steel, thermoplastics, thermosetting polymers, rubber, wood, or other suitable material or combination thereof.

A fishing rod holder having features of the present invention comprises: a frame adapted to support and pivotally hold at least one fishing rod, the frame having an anteriorly disposed side and a posteriorly disposed side, each opposing the other, and opposing sides, the anteriorly disposed side having a plurality of anterior fishing rod accommodations, and the posteriorly disposed side having a plurality of corresponding inverted posterior fishing rod accommodations; a support member for supporting the frame; at least one supplementary strut therebetween the frame and the support member; and mounting means adapted to mount the fishing rod holder thereonto a surface.

DRAWINGS

These and other features, aspects, and advantages of the present invention will become better understood with regard to the following description, appended claims, and accompanying drawings where:

DESCRIPTION

The preferred embodiments of the present invention will be described with reference to FIGS. 1–10 of the drawings. Identical elements in the various figures are identified with the same reference numbers.

Figures 1, 2, 3:
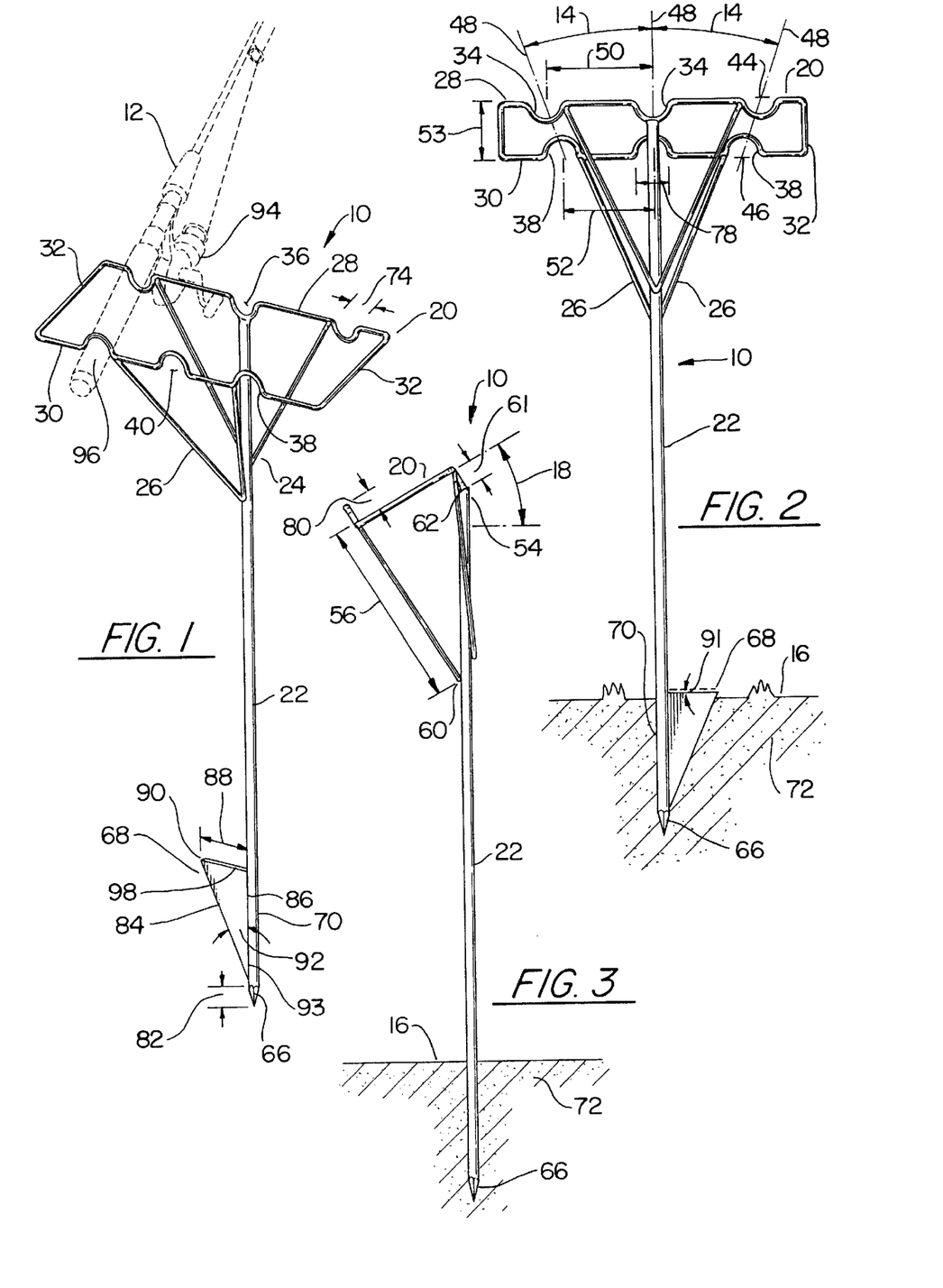
FIG. 1 is a perspective view of a fishing rod holder, constructed in accordance with the present invention.
FIG. 2 is a back view of the fishing rod holder of FIG. 1 engaged in the ground.
FIG. 3 is a side view of the fishing rod holder of FIG. 1.

FIGS. 1–3 show an embodiment of the present invention, a fishing rod holder 10, constructed in accordance with the present invention, for holding at least one fishing rod 12, angularly offset one from the other by angle 14, and angularly disposed from a surface 16 by angle 18, the fishing rod holder 10 having frame 20 for supporting and pivotally holding a plurality of the fishing rods 12, support member 22, and supplementary anteriorly and posteriorly disposed struts 24 and 26, respectively, spanning therebetween and adjoined thereto the frame 20 and the support member 22, for strengthening the fishing rod holder 10.

The frame 20 has an anteriorly disposed side 28 and a posteriorly disposed side 30, each opposing the other, and opposing sides 32. The anteriorly disposed side 28 has a plurality of anterior fishing rod accommodations 34 substantially symmetrically located about midpoint 36 of the anteriorly disposed side 28, and the posteriorly disposed side 30 has a plurality of inverted posterior fishing rod accommodations 38, substantially symmetrically located about midpoint 40 of the posteriorly disposed side 30, the anterior disposed fishing rod accommodations 34 and the inverted posterior fishing rod accommodations 38 corresponding one to the other. The midpoints 36 and 40 of the anteriorly disposed side 28 and the posteriorly disposed side 30, respectively define centerline 42, therebetween the anteriorly disposed side 28 and the posteriorly disposed side 30.

Ones of the fishing rods 12 may be removably mounted, pivotally supported, and held therein each of the anterior fishing rod accommodations 34 and the corresponding ones of the inverted posterior fishing rod accommodations 38.

The fishing rod holder 10 may have an odd number of the anterior fishing rod accommodations 34 and a corresponding odd number of the corresponding inverted posterior fishing rod accommodations 38, as shown in FIGS. 1–3, or the fishing rod holder 10 may be alternatively constructed with an even number of the anterior fishing rod accommodations 34 and a corresponding even number of the corresponding inverted posterior fishing rod accommodations 38 (not shown).

Each of the anterior fishing rod accommodations 34 have midpoint 44, defined along the anteriorly disposed side 28, and each of the posterior fishing rod accommodations 38 have midpoint 46, defined along the posteriorly disposed side 30, the midpoints 44 and 46 defining corresponding centerlines 48 therebetween the corresponding anterior fishing rod accommodations 34 and the corresponding inverted posterior fishing rod accommodations 38.

Each of the midpoints 44 of the anterior fishing rod accommodations 34 are separated one from the other by distance 50, and each of the midpoints 46 of the inverted posterior fishing rod accommodations 38 are separated one from the other by distance 52, the distances 50 therebetween the midpoints 44 of the anterior fishing rod accommodations 34 being greater than the distances 52 of the corresponding inverted posterior fishing rod accommodations 38. The corresponding centerlines 48 therebetween the corresponding anterior fishing rod accommodations 34 and the corresponding inverted posterior fishing rod accommodations 38, and distance 53 therebetween the anteriorly disposed side 28 and the posteriorly disposed side 30, thus, define the angles 14 at which the fishing rods 12 are angularly offset one from the other.

The frame 20 is adjoined to top 54 of the support member 22. The posteriorly disposed struts 26, each having length 56, are adjoined to the posteriorly disposed side 30 at junctures 58 and to the support member 22 at junctures 60. The length 56 of the posteriorly disposed struts 26, the distance 53 therebetween the anteriorly disposed side 28 and the posteriorly disposed side 30, and depth 61 of any centrally disposed one of the anterior fishing rod accommodations 34 defines the angle 18, or attitude, at which the fishing rods 12 are angularly disposed from the surface 16. The fishing rod holder 10 may have a plurality of the posteriorly disposed struts 26, as shown in FIGS. 1–3, or the fishing rod holder 10 may be constructed with one of the posteriorly disposed struts 26 (not shown). The anteriorly disposed struts 24, which adjoin the frame 20 at junctures 62 and the support member 22 at juncture 64, are optional.

The support member 22 has a substantially pointed tip 66 and a substantially triangular shaped anchor 68 adjoined thereto and thereat the vicinity of base portion 70 of the support member 22, each of which facilitate mounting and engaging the fishing rod holder 10 in the ground 72.

The fishing rod holder 10 may be of metal, such as aluminum, brass, copper, steel, thermoplastics, thermosetting polymers, rubber, wood, or other suitable material or combination thereof. The fishing rod holder 10 may be of unitary construction. The frame 20 is preferably of unitary construction and may be of configured tubing, rod, or stiffened wire, and/or molded to shape, and/or machined, depending upon the material used. The anterior fishing rod accommodations 34 and the inverted posterior fishing rod accommodations 38 are preferably arcuate shaped and facilitate ease of unitary construction of the frame 20. The fishing rod holder 10 may be painted a suitable color.

A typical fishing rod holder 10 having three of the anterior disposed fishing rod accommodations 34 and three of the corresponding inverted posterior fishing rod accommodations 38, for example, may preferably have the following approximate dimensions:

width 74 and the depth 61 of each of the anterior fishing rod accommodations 34, which are preferably arcuate shaped, are preferably ⅞ inches wide and ⅞ inches deep, respectively;

width 78 and the depth 80 of each of the posterior fishing rod accommodations 38, which are preferably arcuate shaped, are preferably ⅞ inches wide and ⅞ inches deep, respectively;

each of the midpoints 44 of the anterior fishing rod accommodations 34 are preferably separated one from the other by the distance 50 of approximately 4 ⅞ inches;

each of the midpoints 46 of the inverted posterior fishing rod accommodations 38 are preferably separated one from the other by the distance 52 of approximately 3⅞;

the anteriorly disposed side 28 and the posteriorly disposed side 30 are preferably separated one from by the distance 53 of approximately 3 inches; the length 56 of the posteriorly disposed struts 26 is adjusted to define the angle 18, or attitude, at preferably approximately 30 degrees, at which the fishing rods 12 are angularly disposed from the surface 16;

the tip 66 is preferably tapered to approximately ten degrees;

the substantially triangular shaped anchor 68 is adjoined thereto and thereat the vicinity of base portion 70 of the support member 22 preferably starting at a distance 82 approximately 2 inches from the tip 66 and rising upwards therefrom;

the substantially triangular shaped anchor 68 is approximately ⅛ inch thick and has exterior side 84 having a length of preferably approximately 7 inches, adjoined side 86 of the anchor 68 having a length of preferably approximately 6¾, and distance 88 of preferably approximately 3 inches from the support member 22 to vertex 90 atop the exterior side 84 of the anchor 68, which defines a downwardly disposed angle 91 of preferably approximately 25.4 degrees;

the support member 22 has a diameter of preferably approximately ½ inch and a length of approximately 36 inches;.

the frame 20 having the anteriorly disposed side 28, which has the plurality of the anterior fishing rod accommodations 34, the posteriorly disposed side 30, which has the plurality of the plurality of the inverted posterior fishing rod accommodations 38, and the opposing sides 32 are preferably configured from preferably approximately ⅛ inch stock; and the anteriorly and the posteriorly disposed struts 24 and 26, respectively, are of preferably approximately ⅛ inch stock.

The support member 22 has the substantially pointed tip 66 and the substantially triangular shaped anchor 68 adjoined thereto and thereat the vicinity of base portion 70 of the support member 22, each of which facilitate engaging the fishing rod holder 10 in the ground 72. Angle 92 of preferably approximately 25.4 degrees at base vertex 93 of the anchor 68 further facilitates engaging the fishing rod holder 10 in the ground 72.

The distance 50 of approximately 4⅞ inches therebetween each of the midpoints 44 of the anterior fishing rod accommodations 34, the distance 52 of approximately 3⅞ inches therebetween each of the midpoints 46 of the posterior fishing rod accommodations 38, and distance 82 therebetween the anteriorly disposed side 28 and the posteriorly disposed side 30 of approximately 3 inches results in the angle 14 of approximately 18.4 degrees, at which the centerlines 48 are offset one from the other, and, thus, the angular offset of approximately 18.4 degrees at which the fishing rods 12 are angularly disposed one from the other.

The distance 53 of approximately 3 inches therebetween the anteriorly disposed side 28 and the posteriorly disposed side 30 allows reels 94 of the fishing rods 12 to be disposed forward of the anteriorly disposed side 28, which facilitates quick and easy mounting and removal of the fishing rods 12 from the fishing rod holder 10.

The width 74 and the depth 61 of each of the anterior fishing rod accommodations 34, which are preferably arcuate shaped, and preferably ⅞ inches wide and ⅞ inches deep, respectively; and the width 78 and the depth 80 of each of the posterior fishing rod accommodations 38, which are preferably arcuate shaped, and preferably ⅞ inches wide and ⅞ inches deep, respectively, facilitates quick and easy mounting and removal of fishing rod handles 96 of the fishing rods 12 from the fishing rod holder 10.

The substantially triangular shaped anchor 68 having a downwardly disposed angle 97 of preferably 25.4 facilitates engaging the anchor 68 thereinto the ground by exerting foot pressure atop top side 98 of the anchor 68. As foot pressure is exerted atop the top side 98, any slippage of the foot is directed downward and slightly toward the support member 22, in order to help prevent slippage of the foot off the top side 98 of the anchor 68.

The support member 22 has a substantially pointed tip 66 and a substantially triangular shaped anchor 68 adjoined thereto and thereat the vicinity of base portion 70 of the support member 22, each of which facilitate engaging the fishing rod holder 10 in the ground 72.

Construction, materials, and dimensions of the fishing rod holder 10 may vary depending upon the conditions that the fishing rod holder 10 will be used under, the types and weights of fish sought, and the dimensions of the fishing rods 12.

Figures 4, 5:
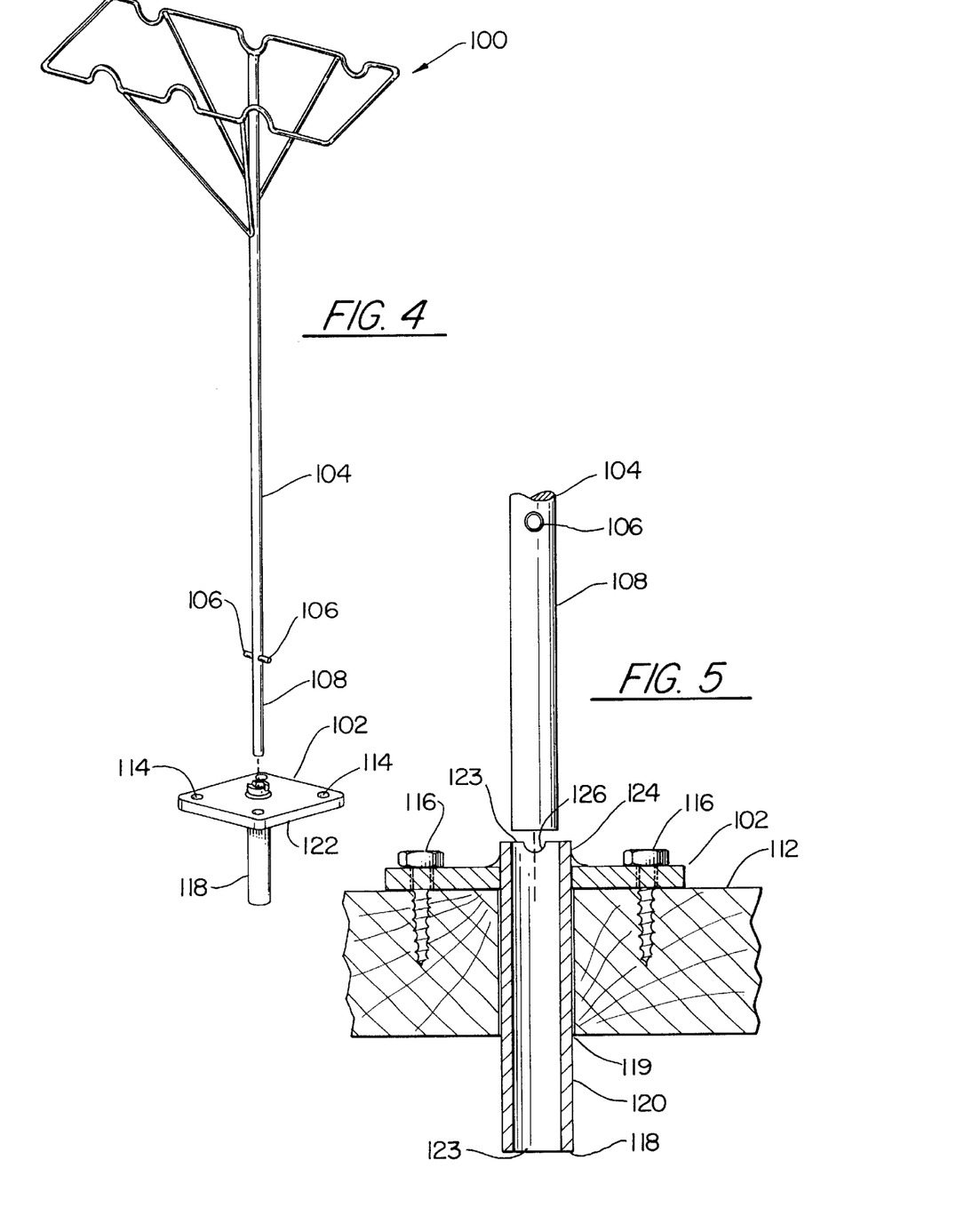
FIG. 4 is an exploded perspective view of a an alternate embodiment of a fishing rod holder, constructed in accordance with the present invention.
FIG. 5 is a side view of a portion of a removably attachable support member of the fishing rod holder of FIG. 4 and a section view of a mount for removably attaching the support member thereto, the mount fastened thereto a dock.

FIGS. 4 and 5 show an alternate embodiment of a fishing rod holder 100, which is substantially the same as the fishing rod holder 10, except that the fishing rod holder 100 has a mounting plate 102 and support member 104, the support member 104 having mounting studs 106 protruding therefrom in proximity to base portion 108 of the support member 104.

The mounting plate 102 may be mounted thereon dock 112. The mounting plate 102 has a plurality of holes 114, having lag bolts 116 inserted therethrough and into the dock 112, which are used to fasten the mounting plate 102 to the dock 112. The mounting plate 102 also has tube 118 extending therethrough. The dock 112 may have hole 119 therein the dock 112, or the hole 119 may be drilled prior to installation of the mounting plate 102, the hole 114 for receiving lower portion 120 of the tube 118 extending therefrom bottom 122 of the mounting plate 102.

The tube 118 has hole 123. The support member 104 may be removably mounted thereto the mounting plate 102, the support member 104 being removably inserted thereinto the hole 123 at upper portion 124 of the tube 118, the tube 118 having notches 126 for matingly receiving and stopping the mounting studs 106 thereat, stopping the support member 104 thereat the mounting studs 106 at a certain depth of insertion, and setting the support member 104 thereinto place and facing in a desired direction.

Figure 6:
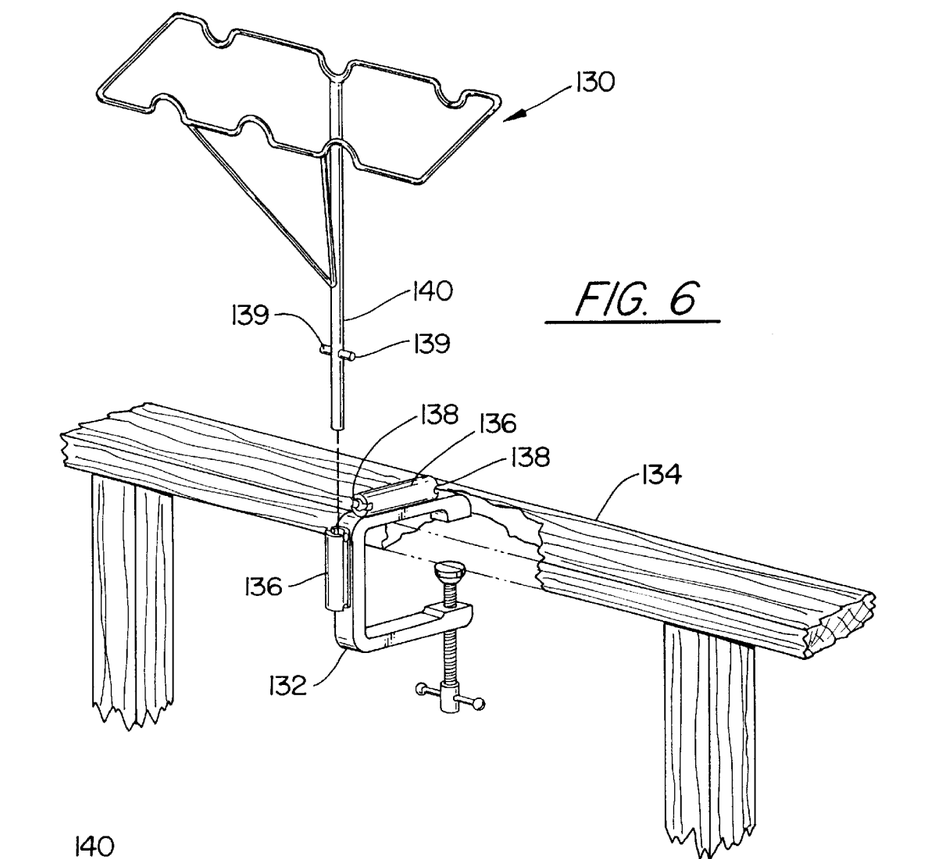
FIG. 6 is an exploded perspective view of an alternate embodiment of a fishing rod holder, constructed in accordance with the present invention, with a clamp of the fishing rod holder affixed to a railing.
Figures 7, 8:
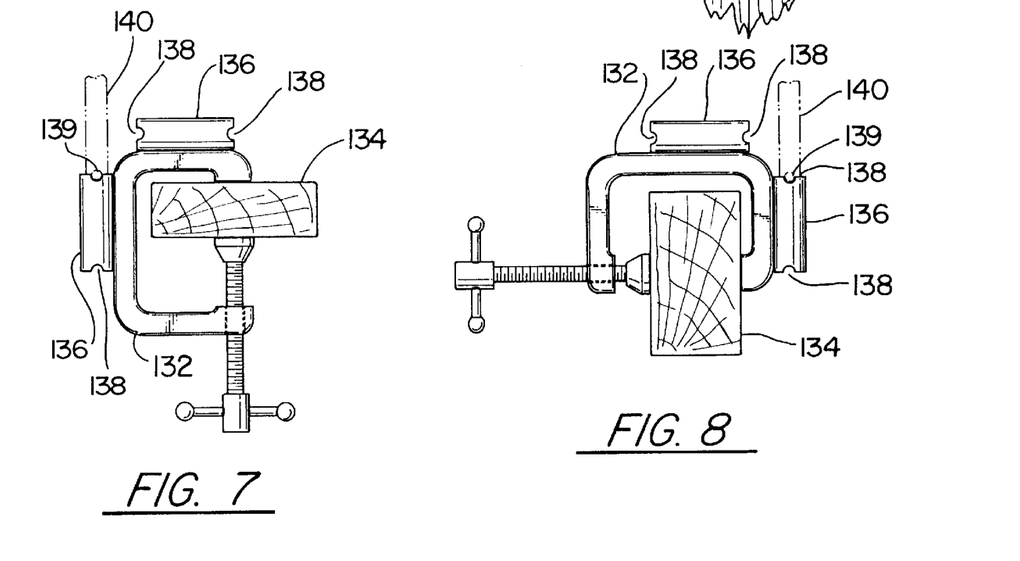
FIG. 7 is a side view of the clamp of the fishing rod holder of FIG. 6 clamped to the railing.
FIG. 8 is a side view of the clamp of the fishing rod holder of FIG. 6 clamped to an alternate railing in an alternate orientation from the clamp of FIG. 7.

FIGS. 6–8 show an alternate embodiment of a fishing rod holder 130, which is substantially the same as the fishing rod holder 100, except that the fishing rod holder 130 has a clamp 132 for removably mounting the fishing rod holder 130 to a railing 134. The clamp 132 has two substantially perpendicularly disposed tubes 136 adjoined thereto, each of the tubes 136 having notches 138 for matingly receiving studs 139 protruding therefrom support member 140. Orientation of the clamp 132 may be changed, depending upon the shape and orientation of the railing 134, as shown in FIGS. 7 and 8.

Figures 9, 10:
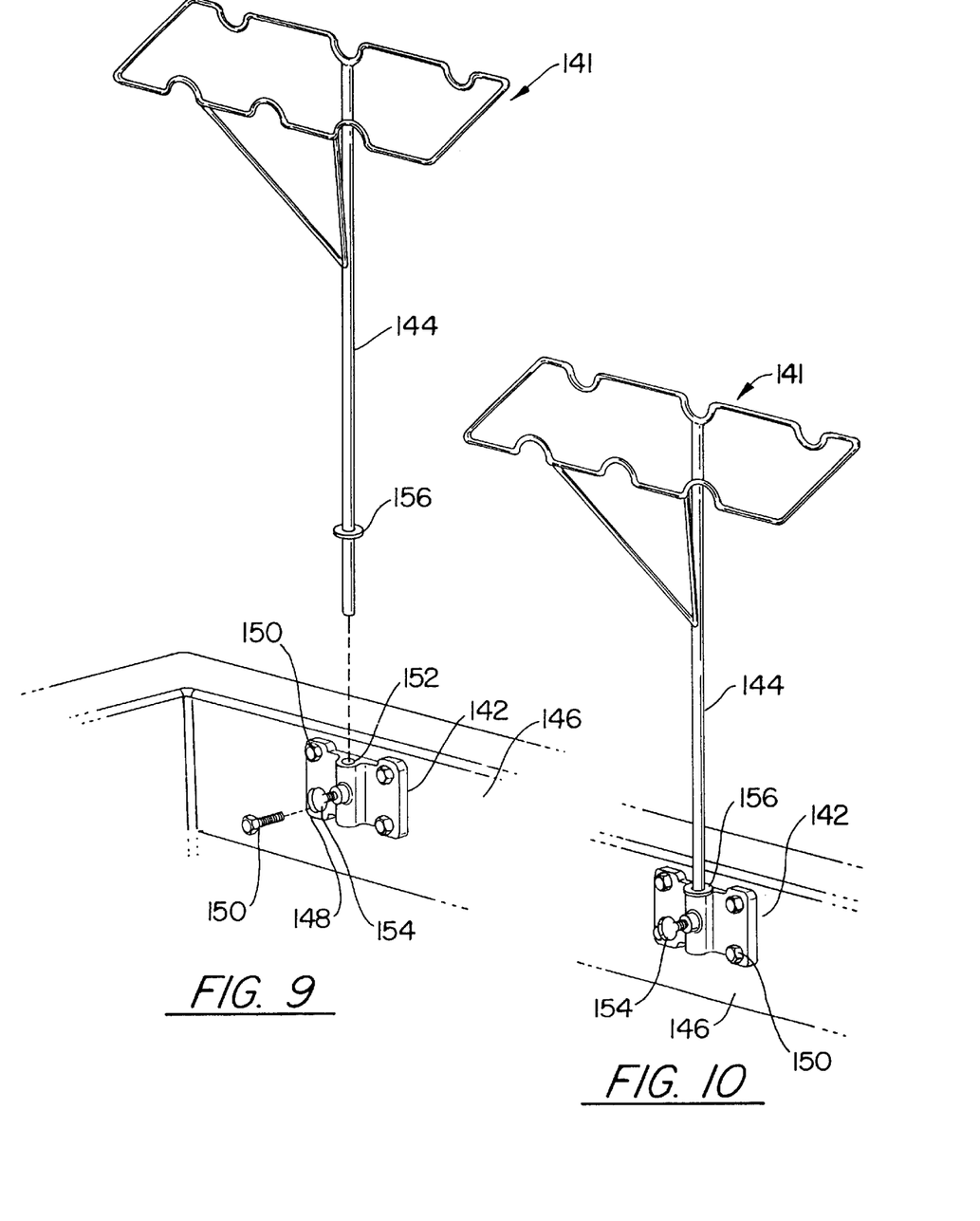
FIG. 9 is an exploded perspective view of an alternate embodiment of a fishing rod holder, constructed in accordance with the present invention, with a mounting fixture of the fishing rod holder mounted on a boat.
FIG. 10 is a perspective view of the fishing rod holder of FIG. 9 mounted on the boat.

FIGS. 9 and 10 show an alternate embodiment of a fishing rod holder 141, which is substantially the same as the fishing rod holder 100, except that the fishing rod holder 141 has a mounting plate 142 and support member 144, which may be used to facilitate removably mounting the fishing rod holder 141 to a boat 146.

Figure 11:
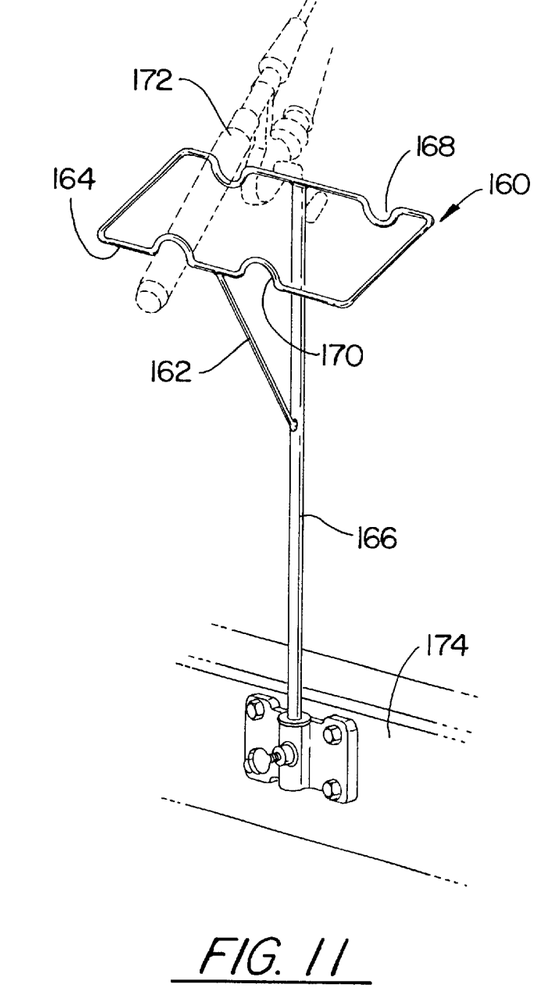
FIG. 11 is a perspective view of an alternate embodiment of a fishing rod holder, constructed in accordance with the present invention, having one supplementary posteriorly disposed strut.

The mounting plate 142 has a plurality of holes 148 for inserting lag bolts 150 therethrough and fastening the mounting plate 142 thereto the boat 146. The mounting plate 142 also has hole 152 for removably inserting and removably mounting the support member 144 thereinto. Optional set screw 154 is also provided to lock the fishing rod holder 140 in place and in a desired orientation. The support member has a disk 156 fastened thereto for stopping the support member 144 at a certain depth of insertion FIG. 11 shows an alternate embodiment of a fishing rod holder 160, which is substantially the same as the fishing rod holder 141, except that the fishing rod holder 160 has one supplementary posteriorly disposed strut 162 therebetween frame 164 and support member 166, and two each anterior fishing rod accommodations 168 and corresponding inverted posterior fishing rod accommodations 170, respectively, for supporting and pivotally holding two fishing rods 172. The fishing rod holder 160 is mounted on boat 174, the support member 166 preferably being approximately 16 inches long.

Figure 12:
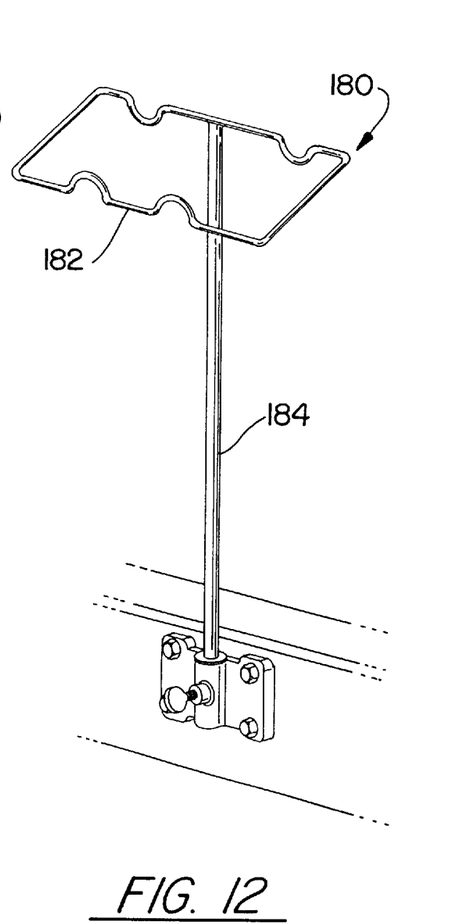
FIG. 12 is a perspective view of an alternate embodiment of a fishing rod holder, constructed in accordance with the present invention, having a frame cantilevered from a support member.

FIG. 12 shows an alternate embodiment of a fishing rod holder 180, which is substantially the same as the fishing rod holder 160, except that the fishing rod holder 180 has a frame 182 which is cantilevered from support member 184.

Although the present invention has been described in considerable detail with reference to certain preferred versions thereof, other versions are possible. Therefore, the spirit and scope of the appended claims should not be limited to the description of the preferred versions contained herein.

What is claimed is:

1. A fishing rod holder, comprising:
    frame adapted to support and pivotally hold at least one fishing rod,
    said frame having an anteriorly disposed side and a posteriorly disposed side,
    each opposing the other, and opposing sides,
    said anteriorly disposed side having a plurality of anterior fishing rod accommodations, and
    said posteriorly disposed side having a plurality of corresponding inverted posterior fishing rod accommodations;
    a single support member attached at a first end to one of said anteriorly or posteriorly disposed sides;
    at least one supplementary strut therebetween said other of said anteriorly or posteriorly sides and said support member; and
    mounting means at a second end of said support member adapted to mount said fishing rod holder thereonto a surface.

2. The fishing rod holder according to claim 1, wherein said frame is adapted to support and pivotally hold a plurality of fishing rods angularly disposed one from the other.

3. The fishing rod holder according to claim 2, wherein said anterior fishing rod accommodations are located farther apart one from the other than said corresponding inverted posterior fishing rod accommodations.

4. The fishing rod holder according to claim 1, wherein said frame is adapted to support and pivotally hold said at least one fishing rod angularly disposed at an attitude.

5. The fishing rod holder according to claim 4, wherein said fishing rod holder is adapted to have said posteriorly disposed side located lower than said anteriorly disposed side, when said fishing rod holder is mounted thereonto said surface.

6. The fishing rod holder according to claim 1, wherein said anteriorly disposed side has a midpoint and said posteriorly disposed side has a midpoint,
    said anterior fishing rod accommodations being symmetrically located about said anteriorly disposed side midpoint,
    and said inverted posterior fishing rod accommodations being symmetrically located about said posteriorly disposed side midpoint.

7. The fishing rod holder according to claim 1, wherein said anterior fishing rod accommodations are arcuate shaped, and said inverted posterior fishing rod accommodations are arcuate shaped.

8. The fishing rod holder according to claim 1, wherein said mounting means has an anchor adjoined to said support member, which is adapted to engage and mount said fishing rod holder thereinto the ground.

9. The fishing rod holder according to claim 8, wherein said anchor is triangularly shaped.

10. The fishing rod holder according to claim 9, wherein said support member has a pointed tip.

11. The fishing rod holder according to claim 1, wherein said mounting means matingly receives said support member and said mounting means is adapted to be affixed to a surface.

12. The fishing rod holder according to claim 11, wherein said mounting means has a mounting plate and a notched tube mounted thereto, and
    said support member has studs protruding therefrom,
    said mounting plate having holes for bolts to be inserted therethrough and adapted to fasten said mounting plate to said surface,
    said notched tube for removably and matingly receiving said support member therein, said notched tube having notches for matingly receiving said mounting studs, stopping said mounting studs thereat, stopping said support member thereat said mounting studs at a certain depth of insertion, and setting said support member thereinto place and facing in a desired direction.

13. The fishing rod holder according to claim 11, wherein said mounting means has a mounting clamp and perpendicularly directed notched tubes adjoined thereto, said clamp adapted to be fastened to said surface in a desired orientation, and said support member has studs protruding therefrom, said notched tubes for removably and matingly receiving said support member therein a selected one of said notched tubes, said notched tube having notches for matingly receiving said mounting studs, stopping said mounting studs thereat, stopping said support member thereat said mounting studs at a certain depth of insertion, and setting said support member thereinto place and facing in a desired direction.

14. The fishing rod holder according to claim 11, wherein said mounting means has a mounting plate, and said support member bas a disk affixed thereto, said mounting plate having holes for bolts to be inserted therethrough and adapted to fasten said mounting plate to said surface, said mounting plate having a hole for removeably and matingly receiving said support member therein, said disk stopping adjacent said mounting plate and stopping said support member thereat a certain depth of insertion, said mounting plate having a set screw for setting said support member thereinto place and facing in a desired direction.

15. The fishing rod holder according to claim 1, wherein said fishing rod holder is constructed of materials from the group consisting of metals, thermoplastics, thermosetting polymers, rubber, and wood.

16. The fishing rod holder according to claim 1, wherein said fishing rod holder is constructed of materials from the group consisting of aluminum, brass, copper, and steel.

17. A fishing rod holder, comprising:

a frame adapted to support and pivotally hold at least one fishing rod, said frame having an anteriorly disposed side and a posteriorly disposed side, each opposing the other, and opposing sides, said anteriorly disposed side having a plurality of anterior fishing rod accommodations, and said posteriorly disposed side having a plurality of corresponding inverted posterior fishing rod accommodations;

a single support member attached at a first end to one of said anteriorly or posteriorly disposed sides;

said frame cantilevered from said support member; and mounting means at a second end of said support member adapted to mount said fishing rod holder thereonto a surface.

18. The fishing rod holder according to claim 17, wherein said frame is adapted to support and pivotally hold a plurality of fishing rods angularly disposed one from the other.

19. The fishing rod holder according to claim 17, wherein said frame is adapted to support and pivotally hold said at least one fishing rod angularly disposed at an attitude.

20. The fishing rod holder according to claim 1, wherein said at least one supplementary strut therebetween said frame and said support member spans angularly therebetween said frame and said support member and is affixed to said frame and said support member at opposing ends of said at least one supplementary strut.

21. The fishing rod holder according to claim 1, wherein said at least one supplementary strut therebetween said frame and said support member spans angularly therebetween said posteriorly disposed side of said frame and said support member.

22. The fishing rod holder according to claim 1, wherein said at least one supplementary strut therebetween said frame and said support member comprises at least two supplementary support struts, which span angularly therebetween said posteriorly disposed side of said frame and said support member.

23. The fishing rod holder according to claim 1, wherein said at least one supplementary strut therebetween said frame and said support member comprises at least one supplementary support strut, which span angularly therebetween said anteriorly disposed side of said frame and said support member, and at least two supplementary support struts, which span angularly therebetween said posteriorly disposed side of said frame and said support member.

24. The fishing rod holder according to claim 1, wherein said at least one supplementary strut therebetween said frame and said support member comprises at least two supplementary support struts, which span angularly therebetween said anteriorly disposed side of said frame and said support member, and at least two supplementary support struts, which span angularly therebetween said posteriorly disposed side of said frame and said support member.

* * * * *